United States Patent [19]
Kunz

[11] 4,179,005
[45] Dec. 18, 1979

[54] WEIGHING APPARATUS CALIBRATION MEANS AND METHOD

[75] Inventor: Peter Kunz, Tann-Rüti, Switzerland

[73] Assignee: Mettler Instrumente AG, Greifensee, Switzerland

[21] Appl. No.: 951,087

[22] Filed: Oct. 13, 1978

[30] Foreign Application Priority Data

Apr. 19, 1978 [CH] Switzerland .................. 4184/78

[51] Int. Cl.$^2$ .......................... G01G 7/00; G01G 3/14
[52] U.S. Cl. .......................... 177/212; 177/210 EM; 73/1 B
[58] Field of Search ............... 177/210 EM, 212; 73/1 B

[56] References Cited

U.S. PATENT DOCUMENTS

| | | | |
|---|---|---|---|
| 3,688,854 | 9/1972 | Strobel | 177/212 |
| 3,973,637 | 8/1976 | Kunz | 177/189 |
| 3,986,571 | 10/1976 | Strobel et al. | 177/185 |
| 4,043,415 | 8/1977 | Luchinger | 177/255 |
| 4,062,417 | 12/1977 | Kunz | 177/212 |
| 4,090,575 | 5/1978 | Kunz et al. | 177/210 EM |

FOREIGN PATENT DOCUMENTS 2223439  11/1973  Fed. Rep. of Germany.

*Primary Examiner*—George H. Miller, Jr.
*Attorney, Agent, or Firm*—Lawrence E. Laubscher

[57] ABSTRACT

Weighing apparatus of the electromagnetic load compensation type is disclosed, including a permanent magnet system connected with the stationary frame, a compensation coil connected with the movable scale member, a system for supplying compensating current to the coil to produce a force for returning the movable scale member to its initial no-load position, and an indicating device for displaying the magnitude of the load applied to the movable scale member as a function of the compensating current, characterized by the mounting of a slotted generally U-shaped conductive metal plate in spaced insulated relation concentrically about the core portion of the permanent magnet system. After the weighing apparatus has been completely assembled, the leg portions of the plate are transformer connected with an alternating-current source for calibrating and/or conditioning the permanent magnet system.

10 Claims, 3 Drawing Figures

U.S. Patent    Dec. 18, 1979    4,179,005
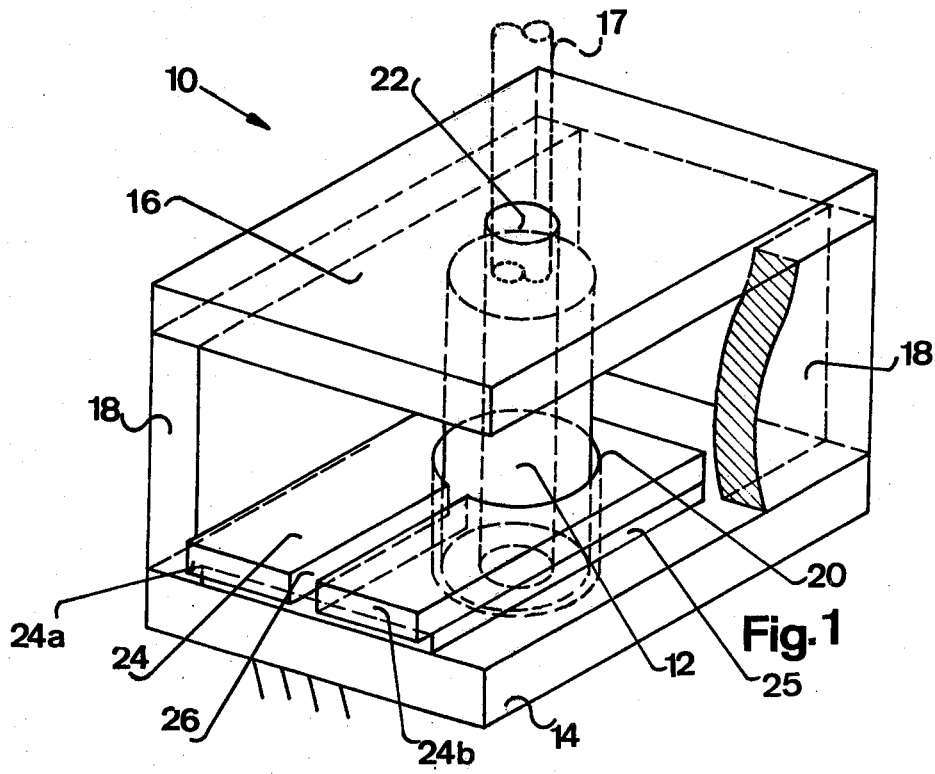
Fig.1
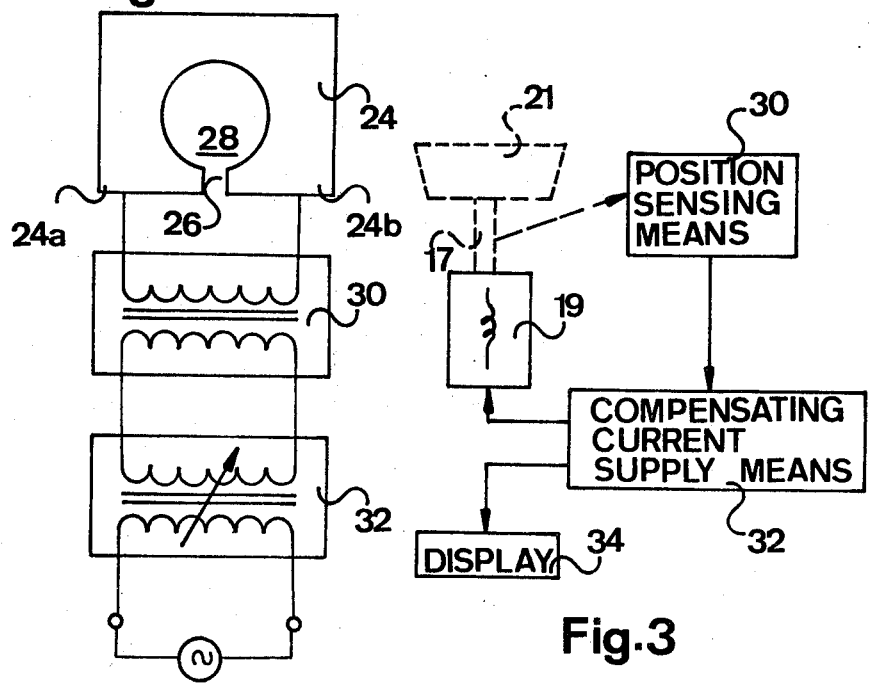
Fig.2
Fig.3

WEIGHING APPARATUS CALIBRATION MEANS AND METHOD

BRIEF DESCRIPTION OF THE PRIOR ART

It is well known in the patented prior art to provide weighing systems of the electromagnetic load compensation type including permanent magnet means connected with the stationary frame of the weighing apparatus, a compensation coil connected with the movable scale member adjacent the permanent magnet means, means for supplying compensating current to the coil to return the movable scale member to its initial no-load position, and indicating means for displaying the load as a function of the compensating current. Examples of such known weighing systems are disclosed in the patents to Kunz U.S. Pat. Nos. 3,973,637 and 4,062,417, Strobel et al U.S. Pat. No. 3,986,571, Luchinger U.S. Pat. No. 4,043,415, and Kunz et al U.S. Pat. No. 4,090,575.

It is also known to vary the operating or saturation point of permanent magnet means by providing an auxiliary coil wound around the magnetic core. Such an auxiliary coil is disclosed in connection with an accelerometer in the German Offenlegungschrift No. 2,223,439. This auxiliary coil, however, permits only small working currents and is moreover generally not readily accessible.

It is further known that magnets for telephone receivers, magnetos and the like—where the maximum field strength is required regardless of aging—require no maturing. However, in the case of permanent magnets used in indicating and recording instruments, it is imperative that they shall be matured for constancy. This may be accomplished as above before assembly, or after assembly, by means of a coil of relatively large diameter, like a looped cable, energized with alternating current, the coil being gradually moved near the instrument until the maturing and calibration are simultaneously accomplished. *Standard Handbook for Electrical Engineers*, McGraw-Hill Book Company, Inc., 1949.

SUMMARY OF THE INVENTION

The present invention was developed to avoid the above and other drawbacks of the known systems and to provide an improved weighing system in which the adjustment of the operating point of the permanent magnet means is readily facilitated, and the assembly and calibration of the scale components is greatly expedited. To solve this problem it is proposed that there be arranged, within the permanent magnet system and electrically insulated from it, a metal plate through which the magnetic core extends and which contains a slit; this metal plate is adapted for connection with the secondary winding of a transformer by means of an opening in the permanent magnet system. This solution offers good accessibility to the "auxiliary coil" which is reduced to the form of a single winding turn and permits the use of greater current intensities. Overall, one can thus achieve a noticeable shortening of the assembly and calibration time.

The metal plate preferably is an aluminum plate. A copper plate, of course, would facilitate even greater current loads but would be considerably heavier and more expensive. In the case of an iron plate, it would be necessary to consider the magnetic shunt effect produced by the plate.

Accordingly, a primary object of the present invention is to provide means for varying (i.e., calibrating) the operating point of the stationary permanent magnet means of an electromagnetically compensated weighing system, use being made of a generally U-shaped metal plate containing a central opening receiving in spaced relation the core portion of the permanent magnet system, and transformer means connecting the leg portions of the metal plate with the terminals of an alternating-current voltage source. The transformer means may include a first transformer having a fixed winding ratio of 2:300, and a network transformer having a variable tap on the secondary side.

BRIEF DESCRIPTION OF THE DRAWING

Other objects and advantages of the invention will become apparent from the following specification when viewed in the light of the accompanying drawing, in which:

FIG. 1 is a perspective view of the permanent magnet system of the present invention;

FIG. 2 is an electrical schematic diagram illustrating the manner in which the adjustment plate is transformer-connected with an alternating-current voltage source; and FIG. 3 is a simplified block diagram of the electromagnetically compensated weighing apparatus.

DETAILED DESCRIPTION

As shown in FIG. 1, the permanent magnet system 10 that is adapted for connection with the stationary scale frame of electromagnetically compensated weighing apparatus includes a tubular permanent magnet core portion 12 that extends vertically between the horizontal spaced bottom and top walls 14 and 16 that engage the bottom and top edges, respectively, of a pair of opposed parallel spaced vertical side walls 18. The top and bottom walls contain openings 22 in alignment with the longitudinal through bore of the core portion 12, thereby to receive the vertical weighing pan or dish support member 17 to which the carrier of the conventional compensation coil 19 (FIG. 3) is secured. The top, bottom and side walls are formed of a ferromagnetic material, such as iron. In accordance with the present invention, a generally U-shaped conductive metal plate 24 is adhesively bonded to the upper surface of a layer 25 of electrical insulation material that in turn is bonded to the bottom wall 14, which plate contains a gap or slot 26 that communicates with the central opening 28 which receives the tubular magnetic core portion 12. The diameter of the central opening 28 is greater than the outer diameter of the core portion 12, thereby to define an annular air gap 20, whereby the plate is spaced and insulated from the permanent magnet system 10. Preferably, the plate 24 is formed of aluminum and has a thickness of about 3 mm. The free extremities of the leg portions 24a and 24b of the plate extend slightly beyond the adjacent edge of the bottom wall 14.

As shown in FIG. 2, the leg portions 24a and 24b of the plate 24 may be connected with an alternating-current voltage source via first and second transformers 32 and 30, the second transformer 30 having a fixed winding ratio (of, for example, 2:300), and the first transformer 32 having a variable tap on the secondary side. The secondary winding of transformer 30 is connected with the two slightly protruding extremities of the legs 24a and 24b of the plate 24, thereby to permit adjustment of the operating point of the permanent magnet means 10.

As shown in FIG. 3, the weighing system is of conventional design and includes position sensing means 30 responsive to the position of the pan support 17 for controlling the compensating current supply means 32 to supply to compensation coil 19 compensating current of a magnitude to restore pan support 17 and pan 21 to the initial no-load position, the load which is applied to the pan 21 being displayed as a function of the compensating current by display means 34.

OPERATION

In operation, after the magnetic core 12 has been magnetized roughly to the saturation point between two strong magnetic poles (not shown), the completed weighing apparatus is finally adjusted by connecting the transformers 30,32 to the plate 24. For this purpose, a weight of known value is placed on the scale pan 21 and the magnetic core 12 is demagnetized step by step until the correct weight indication shows that the desired working point of the magnet has been reached (thereby producing simultaneous rough calibration of the scale and aging (i.e., seasoning) of the magnet). Fine calibration or calibration of the scale can then be accomplished with the known methods, which are of no interest here.

In another variation—which, to be sure, requires a thicker plate 24, or a plate made of copper—the charging and magnetizing of the core 12 can also be accomplished by means of plate 24.

In any case, the magnetizing of the magnetic core is advantageous only after the weighing apparatus has been assembled because, in the case of assembly with previously magnetized magnetic core, the magnetic forces would have a disturbing effect.

Compared to the use of a coil for magnetizing or demagnetizing, whereby the coil is operated with 220 volts, the invention at hand offers the advantage of reduced accident danger because plate 24 permits operation with lower voltage and higher current intensity.

The use of the invention is not confined to permanent magnet systems having cylindrical magnetic cores.

While plate 24 has been disclosed as being mounted adjacent the bottom wall of the permanent magnet system, it can also be attached elsewhere within the permanent magnet system. Furthermore, in case of correspondingly modified design as structural element, it can perform additional functions, (as, for example, a carrying or supporting element for the attachment of the permanent magnet system in the scale).

What is claimed is:

1. In a weighing apparatus of the electromagnetic load compensation type including stationary permanent magnet means, a load compensation coil connected with the movable scale member for movement relative to said permanent magnet means, means for supplying compensating current to said coil for returning the scale member to an initial no-load position, and means for indicating the magnitude of the load as a function of the compensating current;

the improvement which comprises (a) a generally U-shaped conductive metal plate (24); and
   (b) means mounting said plate in spaced insulated relation adjacent a portion of said permanent magnet means, whereby when the leg portions of said plate are connected with an alternating current source, said plate functions as a single winding turn for varying the magnetization of said permanent magnet means.

2. Apparatus as defined in claim 1, wherein said plate is formed of aluminum.

3. Apparatus as defined in claim 1, wherein said permanent magnet means includes a core portion (12); and further wherein said plate contains an opening (28) receiving said core portion, said plate being arranged normal to said core portion, the cross-sectional dimensions of said opening being greater than the corresponding dimensions of said core portion.

4. Apparatus as defined in claim 3, wherein said core portion (12) contains a central longitudinal through bore (22) for receiving the movable scale member and the compensation coil.

5. Apparatus as defined in claim 4, wherein said permanent magnet means further includes spaced horizontal top (16) and bottom (14) walls, and a pair of opposed parallel side walls extending between said top and bottom walls, said walls being formed of a ferromagnetic material, said core portion extending between said top and bottom walls, at least one of said top and bottom walls containing an access opening in alignment with the longitudinal bore of said core portion.

6. Apparatus as defined in claim 5, wherein said mounting means includes a layer of electrically insulating material (25) securing said plate to the upper surface of said bottom wall.

7. Apparatus as defined in claim 5, and further including transformer means for connecting the extremities of the legs of said plate with an alternating-current voltage source.

8. Apparatus as defined in claim 5, wherein said transformer means includes a transformer having a variable tap secondary winding.

9. Apparatus as defined in claim 8, wherein said transformer means includes a transformer having a ratio of 2:300.

10. The method for manufacturing a weighing apparatus of the electromagnetic load compensation type including stationary permanent magnet means including a core portion, a load compensation coil connected with the movable scale member for movement relative to said permanent magnet means, means for supplying compensating current to said coil for returning the scale member to an initial no-load position, and means for indicating the magnitude of the load as a function of the compensating current, which comprises the steps of (a) arranging in concentrically spaced relation about the core portion of said permanent magnet means a generally U-shaped conductive metal plate; and
   (b) connecting the leg portions of said plate by transformer means with an alternating-current voltage source, thereby to vary the magnetization of the permanent magnet means.

* * * * *